United States Patent
Marhelyuk

(10) Patent No.: US 6,671,077 B2
(45) Date of Patent: Dec. 30, 2003

(54) METHOD AND APPARATUS FOR GENERATING RETURN-TO-ZERO MODULATED OPTICAL SIGNALS

(75) Inventor: Anatoliy Marhelyuk, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/123,548

(22) Filed: Apr. 16, 2002

(65) Prior Publication Data

US 2003/0193707 A1 Oct. 16, 2003

(51) Int. Cl.[7] .............................................. G02F 1/01
(52) U.S. Cl. ...................................... 359/238; 398/195
(58) Field of Search ................................ 359/238, 239, 359/181, 183, 187, 276, 245; 398/183, 188, 192, 195

(56) References Cited

U.S. PATENT DOCUMENTS 5,515,196 A * 5/1996 Kitajima et al. ............ 359/180
6,476,952 B1 * 11/2002 Snawerdt .................... 359/173
2002/0109893 A1 * 8/2002 Givehchi .................... 359/181
2003/0002121 A1 * 1/2003 Miyamoto et al. .......... 359/183

* cited by examiner

*Primary Examiner*—Scott J. Sugarman
*Assistant Examiner*—Richard Hanig

(57) ABSTRACT

A method and apparatus for applying an electrical signal as a first of two inputs to a logic element, manipulating the output of the logic element such that the logic element produces a resulting electrical signal that logically transitions only when the input signal has associated with it a predetermined logic state, shaping the resulting electrical signal according to a desired RZ optical signal, amplifying the shaped electrical signal such that a maximum and a minimum signal level of the shaped electrical signal correspond to the adjacent optical power transfer zeroes of an optical modulator, and applying the amplified electrical signal as a driver input to the optical modulator.

15 Claims, 5 Drawing Sheets

600

US 6,671,077 B2

METHOD AND APPARATUS FOR GENERATING RETURN-TO-ZERO MODULATED OPTICAL SIGNALS

FIELD OF THE INVENTION

This invention relates to the field of high-speed optical communication and, more specifically, to optical modulator drivers.

BACKGROUND OF THE INVENTION

Modulated signals are key components in high-speed optical transmission systems. Laser output is modulated into high-speed light pulses that transmit voice, data and/or video signals over fiber-optic cables. The modulators convert continuous laser light output into pulses, which eliminates the need for demanding, high-speed performance from the laser and reduces its cost. The modulator driver circuitry receives an electrical non-return-to-zero (NRZ) signal as its input and converts the NRZ signal to a voltage that is applied to the optical modulator. The modulator varies the intensity of an optical beam in proportion to the voltage applied to it. Thus, the optical beam modulated by the modulator serves as the optical output signal.

Current optical RZ modulators typically comprise two stage modulators, with the first stage forming an optical train of RZ pulses and the second stage selectively suppressing some of the RZ pulses based on the input data stream. The major disadvantages of the existing solution are that two-stage modulators have twice the losses of single-stage modulators and two-stage modulators require twice the number of components to drive the two modulators, increasing the form factor and the cost of the system.

SUMMARY OF THE INVENTION

The invention comprises a method and apparatus for generating return-to-zero modulated optical signals. The invention generates modulated return-to-zero signals from input electrical signals in a single stage format, thus providing lower costs by reducing the number of components and providing lower insertion losses allowing for longer transmission distances.

In one embodiment of the present invention, a method for generating return-to-zero optical signals includes the steps of applying an electrical signal to the first input of a logic element, manipulating the output of the logic element such that the logic element produces a resulting electrical signal that logically transitions only when the input signal has associated with it a predetermined logic state, shaping the resulting electrical signal according to a desired RZ optical signal, amplifying the shaped electrical signal such that a maximum and a minimum signal level of the shaped electrical signal correspond to the adjacent optical power transfer zeroes of an optical modulator, and applying the amplified electrical signal as a driver input to the optical modulator.

In another embodiment of the present invention, an apparatus for generating return-to-zero optical signals includes a logic element for receiving electrical signals as a first input to the logic element, a manipulating element for manipulating the output of the logic element such that the logic element produces a resulting electrical signal that logically transitions only when the input signal has associated with it a predetermined logic state, a pulse shaping element for shaping the resulting electrical signal according to a desired RZ optical signal, an amplifier, for amplifying the shaped electrical signal such that a maximum and a minimum signal level of the shaped electrical signal correspond to the adjacent optical power transfer zeroes of an optical modulator, and an optical modulator for varying the intensity of an input continuous light source in proportion to a voltage applied to it by the amplified electrical signal.

BRIEF DESCRIPTION OF THE DRAWINGS

The teachings of the present invention can be readily understood by considering the following detailed description in conjunction with the accompanying drawings, in which:

FIG. 2b graphically depicts the output of a logic element suitable for use in the system of FIG. 1, after propagation of the electrical signal depicted in FIG. 2a;

To facilitate understanding, identical reference numerals have been used, where possible, to designate identical elements that are common to the figures.

DETAILED DESCRIPTION OF THE INVENTION

The present invention advantageously provides a reduced cost solution for generating return-to-zero (RZ) optical signals from an electrical source input with improved performance and greater flexibility. The improved performance is a result of one stage modulation, which results in less loss, and the greater flexibility is a result of interchangeable pulse-shaping elements, which allow for adjustable RZ pulse durations.

Figure 1:
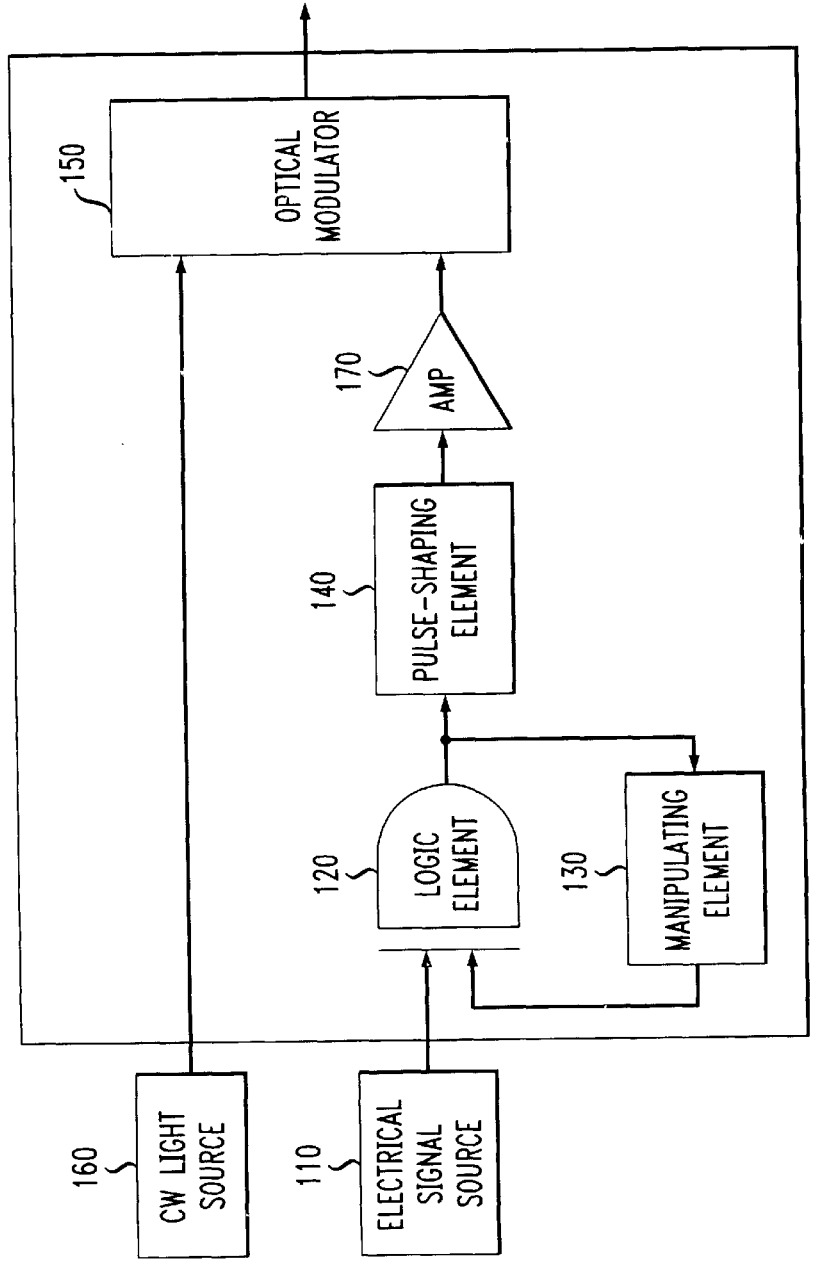
FIG. 1 depicts a block diagram of one embodiment of a system for generating return-to-zero modulated optical signals in single stage format.

FIG. 1 depicts a block diagram of one embodiment of a system 100 for generating RZ modulated optical signals in single stage format. The system 100 of FIG. 1 includes an electrical signal source (illustratively a NRZ data source) 110, a logic element (illustratively an exclusive-or gate (XOR)) 120, a manipulating element (illustratively a delay line) 130, a pulse-shaping element (illustratively a pulse-shaping filter) 140, an amplifier 170, an optical modulator (illustratively a Lithium Niobate Modulator) 150, and a continuous light source 160. The logic element 120, manipulating element 130, pulse-shaping element 140, and amplifier 170 comprise the driver circuitry of system 100 of FIG. 1. Although some of the elements of system 100 in FIG. 1 are depicted as specific devices, other such devices that perform substantially similar functions as the specified elements can be substituted. For example, the electrical signal source 110 of the system 100 of FIG. 1 can be a signal generator; the logic element 120 can be any element or combined elements that have a compatible truth table function; the pulse-shaping element 130 can be a microoptical and integrated optical pulse shaper; and the optical modulator 150 can be a GaAs/AlGaAs modulator.

The signal from a continuous light source 160 is applied to an optical modulator 150 as a first of two inputs. The optical modulator 150 then awaits a second input from the driver circuitry of system 100 of FIG. 1 before transmitting any data. In the driver circuitry, the data from an electrical signal source 110 is applied to a first of two inputs of a logic element 120, and the output of a manipulating element 130 is applied to a second input of the logic element 120, via a feedback network. The function of the logic element 120 is mapped according to Table 1.

TABLE 1

| Input 1 | Input 2 | Output |
|---------|---------|--------|
| L | L | L |
| L | H | H |
| H | L | H |
| H | H | L |

An electrical signal at the output of the logic element 120 is applied to the input of the manipulating element 130. The manipulating element 130 comprises, illustratively, a delay line having a time delay equal to one bit period of the electrical signal. Through a feedback network, the output of the manipulating element 130 provides a delayed signal to the second input of the logic element 120. Logic with the configuration described herein encodes incoming electrical signals such that a logic level '0' will correspond to 'NO TRANSITION' at the output of the logic element, while a logic level '1' will cause transition at the output of the logic element 120. The truth table of the combined logic element 120 and manipulating element 130 in the feedback path is represented in Table 2.

TABLE 2

| Input 1 | Output |
|---------|--------|
| L | No change |
| H | Transition |

As depicted by Table 2 and explained above, the object of the combination of the logic element 120 and the manipulating element 130, is to cause a transition in a resulting signal only when a 'high' or logic level '1' from an input electrical signal source is applied to the input of the logic element 120. Although the above embodiment is described as causing a transition in a resulting signal only when a 'high' or logic level '1' from an input electrical signal source is applied to the input of the logic element 120, it is obvious to those skilled in the art that the present invention can also be modified to operate in the reverse logic condition.

Figure 2A:
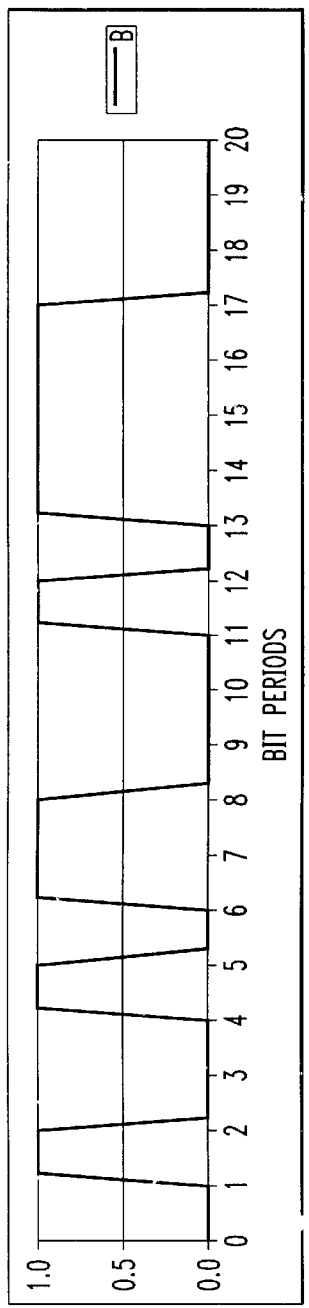
FIG. 2a graphically depicts an example of an electrical signal suitable for use in the system 100 of FIG. 1.
Figure 2B:
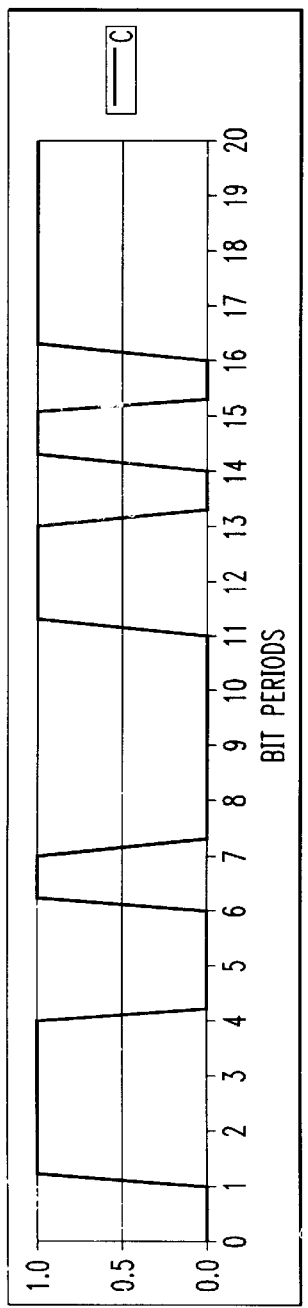
Figure 2C:
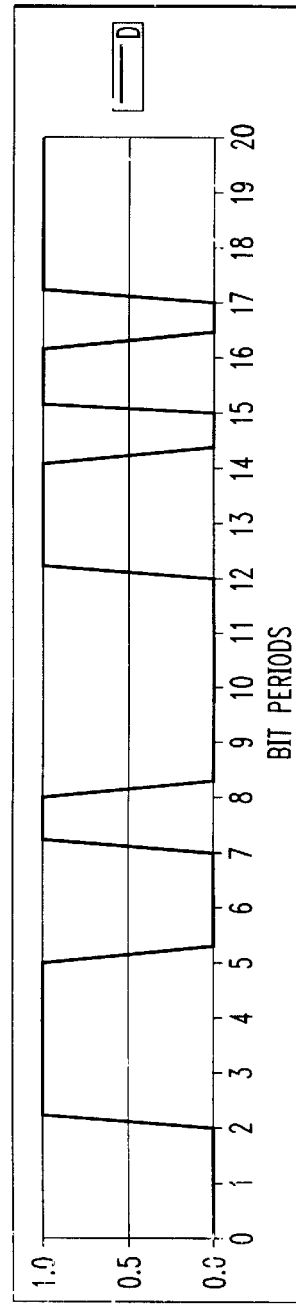
FIG. 2c graphically depicts the electrical signal after propagation through a manipulating element.

FIG. 2a graphically depicts an example of an electrical signal having the logical form of "01001011000101111000" from an electrical signal source suitable for use in the system 100 of FIG. 1. As noted above, the signal from the electrical signal source 110 is applied to the first of two inputs of the logic element 120. The electrical signal from the electrical signal source 110 is manipulated according to the truth table of Table 2 above and the resulting electrical signal is depicted in FIG. 2b. FIG. 2b graphically depicts the resulting electrical signal at the output of the logic element 120 after the manipulation of the electrical signal depicted in FIG. 2a. As illustrated in FIG. 2b, only a high state (logic level '1') at the first input of the logic gate 120 causes a transition in the resulting electrical signal's logic state. FIG. 2c graphically depicts the electrical signal after propagation through the manipulating element 130. As can be seen in FIG. 2c, the electrical signal is delayed by one bit period.

Figure 3A:
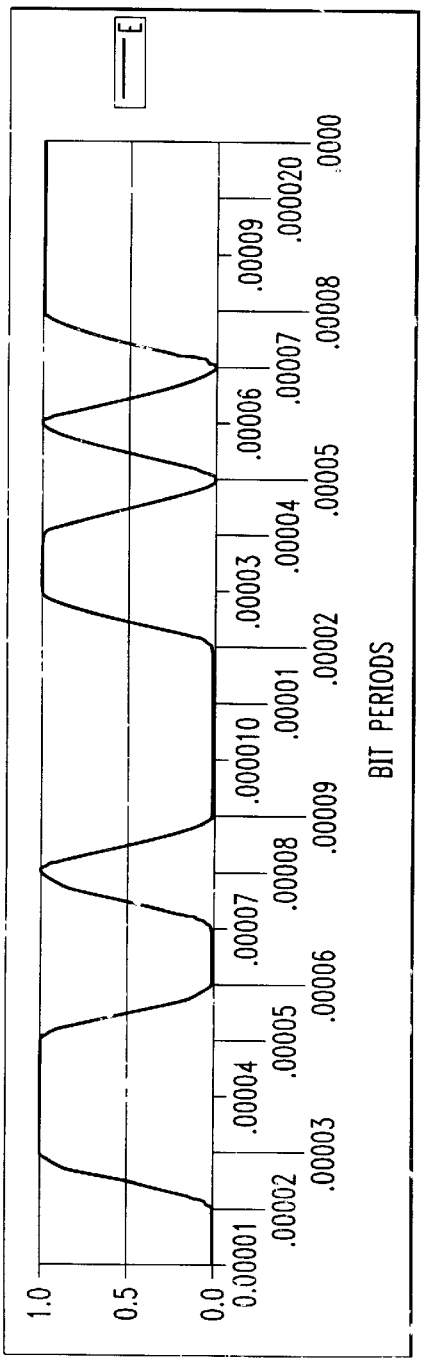
FIG. 3a graphically depicts the output of a pulse-shaping element suitable for use in the system of FIG. 1.

The resulting electrical signal from the output of the logic element 120 is then applied to a pulse-shaping element 140. The pulse-shaping element 140 filters the electrical signal, which in this embodiment includes the delay imparted by the manipulating element 130 in the feedback loop, and shapes the electrical pulses' rising and falling edges to the desired duration and form. In accordance with the principles of the present invention, the pulse-shaping element 130 can be interchanged to allow for the production of RZ pulses of different durations and forms. FIG. 3a graphically depicts the output of the pulse-shaping element 140. FIG. 3a illustrates the effects of the pulse-shaping element 140 on the leading and trailing edges of the resulting electrical signal from the output of the logic element 120. The slopes of the edges will ultimately determine the width of the resulting RZ pulse.

Figure 3B:
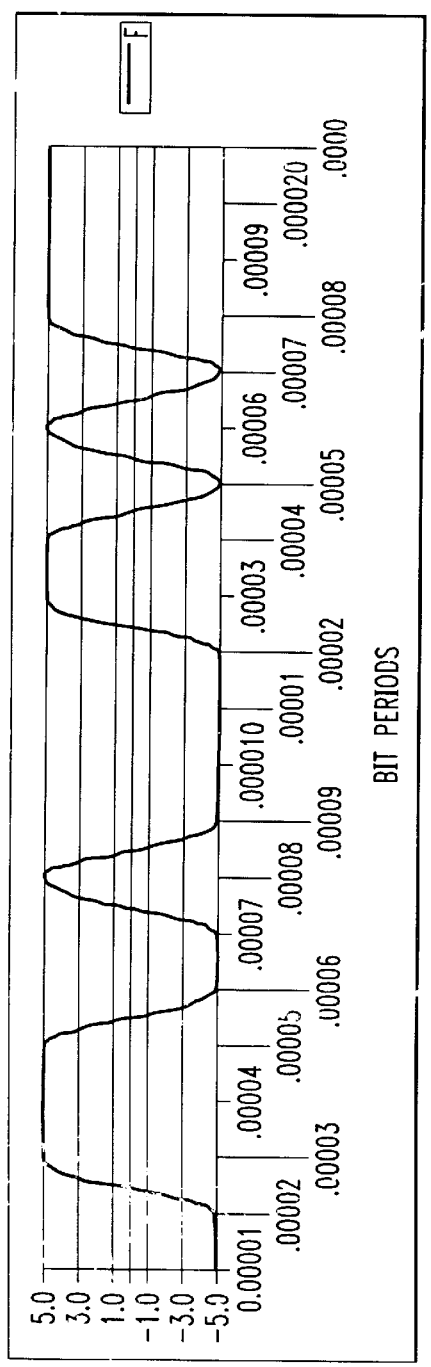
FIG. 3b graphically depicts the output of an amplifier suitable for use in the system of FIG. 1.
Figure 4:
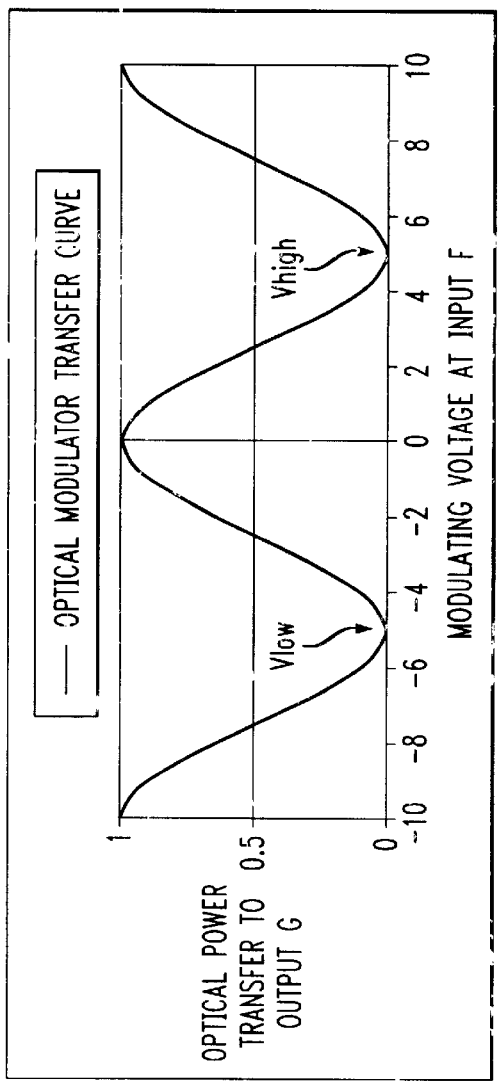
FIG. 4 depicts a typical transfer curve of an optical modulator suitable for use in the system of FIG. 1.

The output of the pulse-shaping element 140 is then applied to the input of an amplifier 170. The amplifier 170 amplifies the electrical signal from the pulse-shaping element 140 to a level appropriate to the optical modulator 150. FIG. 3b graphically depicts the output of the amplifier 170. The amplifier 170 amplifies the electrical signal so that the 'low' signal level at the output corresponds to Vlow of the optical modulator 150 and the 'high' signal level at the output corresponds to Vhigh of the optical modulator 150. Vlow and Vhigh correspond to the adjacent optical power transfer 'zeroes', indicative of a maximum attenuation of the optical modulator 150. FIG. 4 depicts a typical transfer curve of an optical modulator suitable for use in the system 100 of FIG. 1.

Figure 5:
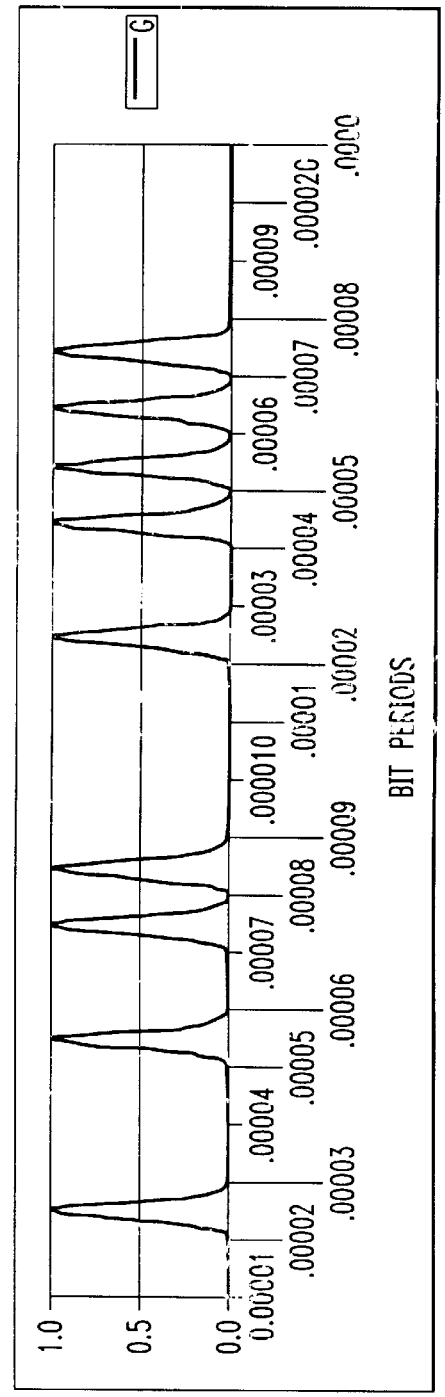
FIG. 5 graphically depicts the modulated return-to-zero output of an optical modulator after the second input signal is applied.

After amplification by the amplifier 170, the electrical signal at the output of the amplifier 170 is applied to the second input of the optical modulator 150. Upon receipt of the electrical signal, the optical modulator 150 varies the intensity of a continuous light source 160 in proportion to the voltage applied to its second input, thus creating RZ pulses of desired width. FIG. 5 graphically depicts the modulated RZ signal output of the optical modulator 150 after the electrical signal from the amplifier 170 is applied to the second input of the optical modulator 150. As depicted in FIG. 5, each transition of the electrical signal between −5v and 5v results in a RZ pulse. Similarly, each transition of the electrical signal between 5v and −5v also results in a RZ pulse. The slope (duration) of the transition determines the width of the resultant RZ pulses.

Figure 6:
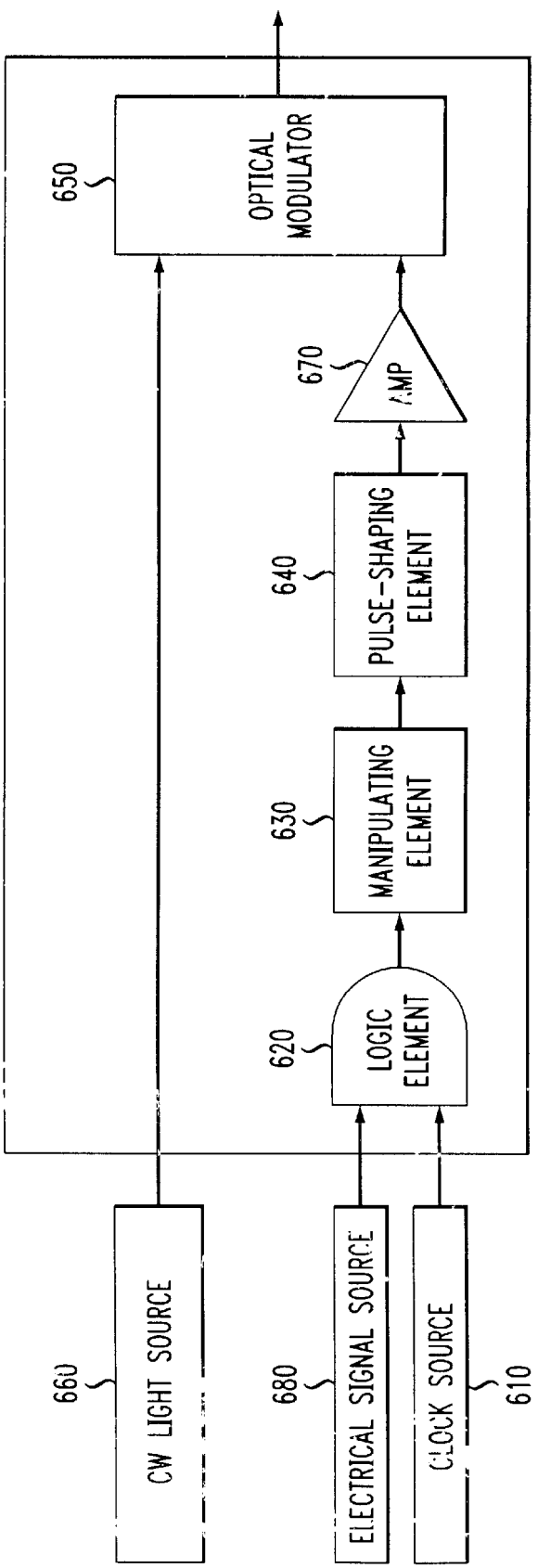
FIG. 6 depicts a block diagram of a second embodiment of a system for generating return-to-zero modulated optical signals in single stage format.

FIG. 6 depicts a block diagram of a second embodiment of a system 600 for generating return-to-zero (RZ) modulated optical signals in single stage format. The system 600 of FIG. 6 includes an electrical signal source 610, a logic element 620, a manipulating element (illustratively a divide-by-two element) 630, a pulse-shaping element 640, an amplifier 670, an optical modulator 650, a continuous light source 660, and a clock source 680. The logic element 620, manipulating element 630, pulse-shaping element 640, and amplifier 670 comprise the driver circuitry of system 600 of FIG. 6. It should be noted that although the manipulating element 630 is depicted as a divide-by-two element, other such devices that perform substantially similar functions, such as a Flip-Flop, can be substituted.

The signal from a continuous light source 660 is applied to an optical modulator 650 as a first of two inputs. The optical modulator 650 then awaits a second input from the driver circuitry of system 600 of FIG. 6 before transmitting any data. In the driver circuitry, the data from an electrical signal source 610 is applied to a first of two inputs of a logic element 620, and the output of a clock source 680 is applied to a second input of the logic element 620. The function of the logic element 620 is mapped according to Table 3.

TABLE 3

| Input 1 | Input 2 | Output |
|---------|---------|--------|
| L | L | L |
| L | H | L |
| H | L | L |
| H | H | H |

The output of the logic element 620 is applied to the input of a manipulating element 630. The manipulating element 630 causes a transition in the resulting electrical signal only after every second transition in the electrical signal output from the logic gate 620. Logic with the configuration described herein encodes incoming electrical signals such that a logic level '0' will correspond to 'NO TRANSITION' at the output of the manipulating element, while a logic level '1' will cause a transition in the resulting electrical signal from the manipulating element 630. The truth table of the manipulating element 630 is represented in Table 4.

TABLE 4

| Input | Output |
|-------|--------|
| L | No change |
| H | Transition |

As depicted by Table 4 and explained above, the object of the combination of the logic element 620 and the manipulating element 630, is to cause a transition in a resulting signal only when a 'high' or logic level '1' from an input electrical signal source is applied to the input of the logic element 620. Although the above embodiment is described as causing a transition in a resulting signal only when a 'high' or logic level '1' from an input electrical signal source is applied to the input of the logic element 620, it is obvious to those skilled in the art that the present invention can also be modified to operate in the reverse logic condition.

The resulting electrical signal from the output of the manipulating element 630 is then applied to a pulse-shaping element 640. The pulse-shaping element 640 filters the electrical signal and shapes the electrical pulses' rising and falling edges to the desired duration and form. In accordance with the principles of the present invention, the pulse-shaping element 630 can be interchanged to allow for the production of RZ pulses of different durations and forms. The slopes of the edges will ultimately determine the width of the resulting RZ pulse.

The resulting electrical signal from the pulse-shaping element 640 is then applied to the input of an amplifier 670, which amplifies the signal to a level appropriate to the optical modulator 650. The amplifier 670 amplifies the electrical signal so that the 'low' signal level at the output corresponds to Vlow of the optical modulator 150, and the 'high' signal level at the output corresponds to Vhigh of the optical modulator 150. Vlow and Vhigh correspond to the adjacent optical power transfer 'zeroes', indicative of a maximum attenuation of the optical modulator 650.

After amplification by the amplifier 670, the electrical signal at the output of the amplifier 670 is applied as the second input of the optical modulator 650. Upon receipt of the electrical signal, the optical modulator 650 varies the intensity of a continuous light source 660 in proportion to the voltage applied to its second input, thus creating RZ pulses of desired width. Each transition of the electrical signal between –5v and 5v results in a RZ pulse. Similarly, each transition of the electrical signal between 5v and –5v also results in a RZ pulse. The slope (duration) of the transition determines the width of the resultant RZ pulses.

In another embodiment of the invention, the pulse-shaping element is substituted by another pulse-shaping element containing different characteristics, for example a different time constant, thus providing electrical signal pulses that have rising and falling edges of different duration and form. This alteration ultimately results in the generation of RZ pulses of different duration and form establishing a system of generating RZ modulated pulses with greater flexibility.

The invention is described above as using specific combinational and sequential logic elements to perform various functions. It will be appreciated by those skilled in the art that a large number of logic elements may be employed, either individually or in combination, to achieve the functions described herein. The inventor contemplates the use of various logical functions and topologies in accordance with the invention and depends upon factors such as the optional driver circuits used, the type of electrical signal conditioning circuitry used, desired electrical and optical signal levels, noise immunity coordinates and the like.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for generating return-to-zero (RZ) optical signals, comprising:

applying an electrical signal to a first input of a logic element;

manipulating the output of the logic element such that said logic element produces a resulting electrical signal that logically transitions only when the input signal has associated with it a predetermined logic state;

shaping said resulting electrical signal according to a desired RZ optical signal;

amplifying the shaped electrical signal such that a maximum and a minimum signal level of the shaped electrical signal correspond to the adjacent optical power transfer zeroes of an optical modulator; and applying the amplified electrical signal as a driver input to the optical modulator.

2. The method of claim 1, wherein said optical modulator is a Lithium Niobate Modulator.

3. The method of claim 1, wherein said logic element is an exclusive-or (XOR) gate.

4. The method of claim 1, wherein said manipulating comprises:

applying the output of said logic element to a delay line, the output of said delay line being applied, via a feedback network, to a second input of the logic element.

5. The method of claim 1, wherein said logic element is an AND gate.

6. The method of claim 1, wherein said manipulating comprises:

applying a clock input to a second input of the logic element; and applying the output of said logic element to a divide-by-two element.

7. The method of claim 1, wherein said manipulating comprises:

applying a clock input to a second input of the logic element; and applying the output of said logic element to a Flip-Flop.

8. An apparatus for generating return-to-zero optical signals, comprising:

a logic element for receiving electrical signals as a first input to said logic element;

a manipulating element for manipulating the output of the logic element such that said logic element produces a resulting electrical signal that logically transitions only when the input signal has associated with it a predetermined logic state;

a pulse shaping element for shaping said resulting electrical signal according to a desired RZ optical signal;

an amplifier, for amplifying the shaped electrical signal such that a maximum and a minimum signal level of the shaped electrical signal correspond to the adjacent optical power transfer zeroes of an optical modulator; and an optical modulator for varying the intensity of an input continuous light source in proportion to a voltage applied to it by the amplified electrical signal.

9. The apparatus of claim 8, wherein said optical modulator is a Lithium Niobate Modulator.

10. The apparatus of claim 8, wherein said logic element is an exclusive-or (XOR) gate.

11. The apparatus of claim 8, wherein said manipulating element is a delay line and wherein the output of said delay line is routed back, via a feedback network, to a second input of the logic element.

12. The apparatus of claim 8 wherein said logic element is an AND gate.

13. The apparatus of claim 8 wherein said manipulating element is a divide-by-two element and wherein a clock input is applied to a second input of the logic element.

14. The apparatus of claim 8, wherein said manipulating element is Flip-Flop and wherein a clock input is applied to a second input of the logic element.

15. An apparatus for generating return-to-zero optical signals, comprising:

a means for applying an electrical signal to a first input of a logic element;

a means for manipulating the output of the logic element such that said logic element produces a resulting electrical signal that logically transitions only when the input signal has associated with it a predetermined logic state;

a means for shaping said resulting electrical signal according to a desired RZ optical signal;

a means for amplifying the shaped electrical signal such that a maximum and a minimum signal level of the shaped electrical signal correspond to the adjacent optical power transfer zeroes of an optical modulator; and a means for applying the amplified electrical signal as a driver input to the optical modulator.

* * * * *